United States Patent [19]

Noda et al.

[11] Patent Number: 5,840,384

[45] Date of Patent: Nov. 24, 1998

[54] AQUEOUS COATING COMPOSITION FOR EXTERIOR SURFACE OF CAN

[75] Inventors: Sumio Noda; Seiji Takami; Keiichi Shimizu; Kaoru Morita, all of Hiratsuka, Japan

[73] Assignee: Kansai Paint Company, Ltd, Japan

[21] Appl. No.: 947,868

[22] Filed: Oct. 9, 1997

Related U.S. Application Data

[63] Continuation of Ser. No. 501,460, Jul. 12, 1995, abandoned.

[30] Foreign Application Priority Data

Jul. 13, 1994 [JP] Japan ................................... 6-186766

[51] Int. Cl.$^6$ ...................................................... C08L 63/00
[52] U.S. Cl. ........................ 428/35.8; 428/413; 428/418; 525/119; 525/438; 523/412; 220/457; 220/458
[58] Field of Search ................................... 428/35.8, 413, 428/418; 525/119, 438; 523/412; 220/457, 458

[56] References Cited

U.S. PATENT DOCUMENTS 5,472,999  12/1995  Kudoh et al. ........................... 525/119

FOREIGN PATENT DOCUMENTS 239404  of 1993  Japan .

*Primary Examiner*—Charles Nold
*Attorney, Agent, or Firm*—Huntley & Associates

[57] ABSTRACT

An aqueous coating composition for exterior surface of a can, in which the resin component comprises a water-soluble or water-dispersible resin product prepared by reacting a resin having carboxyl functionality (a), an epoxy resin (b) and a tertiary amine (c), at least 50 mole % of the epoxy groups of said epoxy resin (b) being quaternary ammonium salt, provides a coating with a smooth and glossy surface, excellent processability, excellent adhesion properties, excellent retorting resistant properties and the like. Furthermore, the coating composition minimizes a generation of fume in an oven during curing.

8 Claims, No Drawings

AQUEOUS COATING COMPOSITION FOR EXTERIOR SURFACE OF CAN

This application is a continuation of application Ser. No. 08/501,460, filed Jul. 12, 1995, now abandoned.

BACKGROUND OF THE INVENTION

1. Field of the Invention

This invention relates to an aqueous coating composition for exterior surface of a can which is capable of forming a coating with a smooth and glossy surface, excellent processability, excellent adhesion properties, excellent retorting resistant properties and the like, and furthermore capable of minimizing the generation of fumes in an oven during curing.

2. Description of the Prior Art

Metallic cans are widely used as vessels for various beverages and foods. The exterior surface of the can is generally treated and printed to prevent corrosion and maintain a desirable appearance and indicate the contents. The procedure for treatment of the exterior surface of the can, in general, involves first size-coating on the metal surface, then white coating, printing, and finishing with a clear coating.

In the past, solvent-based paints such as those containing acrylic/amino resins, polyester/amino resins, or those including epoxy and/or polyether-polyol resins as a reactive diluent have been widely used for the application to the exterior surface of cans. However, these paints contain a large amount of organic solvent and is undesirable from the standpoints of environmental health and fire safety. There is accordingly a need for aqueous can exterior coatings.

Previously known aqueous can exterior coating techniques include that described in Japanese Laid-Open Patent Application No. 239404/93. That publication discloses an aqueous coating composition which comprises, as a main resin component, a water-soluble or water-dispersible acrylic resin, a water-soluble or water-dispersible amino resin, and an amine-modified epoxy resin which can be obtained by the reaction between an epoxy compound and an amine containing at least one active hydrogen directly bonding to the nitrogen atom such as ammonia, primary or secondary amine. However, these compositions exhibit many problems from the standpoints of industrial or environmental hygiene or coating operations because of the generation of a large amounts of fumes during curing. These are believed to result from a large amount of amino resin. Furthermore, the coatings resulting from the compositions mentioned above are inferior in processability, retorting resistant properties and adhesion properties as exterior coatings for cans.

SUMMARY OF THE INVENTION

The present invention provides an aqueous coating composition for the exterior surface of a can which is capable of forming a coating with a smooth and glossy surface, excellent processability, excellent adhesion properties, excellent retorting resistant properties and the like, and furthermore capable of minimizing the generation of fumes in an oven during curing.

Specifically, the present invention provides an aqueous composition for coating the exterior surface of a can, comprising a water-soluble for water-dispersible reaction product prepared from:

(a) from 50 to 90 parts by weight of at least one resin having carboxyl functionality having an acid value of about from 30 to 300 selected from the group consisting of acrylic resin having a number-average molecular weight of 4,000 to 20,000 and polyester resin having a number-average molecular weight of 800 to 3,000;

(b) from 10 to 50 parts by weight of epoxy resin having an epoxy equivalent of about from 380 to 2,300 and a number-average molecular weight of about from 700 to 3,000; and (c) tertiary amine, at least 50 mole % of epoxy groups of the epoxy rein (b) being quaternary ammonium salt.

DETAILED DESCRIPTION OF THE INVENTION

The resin component of an aqueous coating composition of the present invention is a water-soluble or water-dispersible resin product prepared by reacting resin having carboxyl functionality (a), epoxy resin (b) and tertiary amine (c).

RESIN HAVING CARBOXYL FUNCTIONALITY (a)

The resin (a) is at least one resin having carboxyl functionality selected from the group consisting of acrylic resin and polyester resin, having an acid value of about from 30 to 300, preferably about from 40 to 240. An acid value less than about 30 of the resin (a) reduces the storage stability of the coating composition and the crosslinkability of the cured coating, while an acid value more than about 300 of the resin (a) reduces the processability of the cured coating remarkably.

An acrylic resin having carboxyl functionality can be obtained by copolymerizing a vinylic monomers having carboxyl functionality with other copolymerizable monomers by means of emulsion polymerization, solution polymerization, bulk polymerization or the like. Examples of the vinylic monomer having carboxyl functionality are methacrylic acid, acrylic acid, itaconic acid, maleic acid, fumaric acid, crotonic acid and the like, and their acid anhydrides. Other copolymerizable monomers which can be used in the acrylic resin having carboxyl functionality include, for example, $C_{1-24}$ alkyl or cycloalkyl esters of (meth)acrylic acid such as methyl (meth)acrylate, ethyl (meth)acrylate, butyl (meth)acrylate, hexyl (meth)acrylate, 2-ethylhexyl (meth)acrylate, lauryl (meth)acrylate, cyclohexyl (meth)acrylate and the like; vinylic monomers having hydroxyl functionality such as 2-hydroxyethyl (meth) acrylate, 2-hydroxypropyl (meth)acrylate, 4-hydroxybutyl (meth)acrylate and the like; acrylamide, acrylonitrile, styrene, vinyl acetate and the like.

The number-average molecular weight of the acrylic resin having carboxyl functionality is about from 4,000 to 20,000.

A polyester resin having carboxyl functionality is a resin which can be obtained by a per se known method such as esterification or transesterification reaction by using, as ingredients, polyhydric alcohols, polybasic acids, and optionally hydroxy-acids, monoepoxy compounds or monobasic acids for molecular weight control, in an amount sufficient to provide the above-mentioned acid value. Polyhydric alcohols which can be used include, for example, dihydric alcohols such as cyclohexane-1,4-dimethanol, 1,6-hexanediol, neopentyl glycol, 3,3-dimethylolheptane, ethylene glycol, propylene glycol, trimethylene glycol, 1,2-, 1,3-, 1,4-, or 2,3-butanediol, 1,2-, 1,4-, 1,5- or 2,4-pentanediol, 2-ethyl-2-n-butyl- 1,3-dihydroxypropane, tricyclodecanedimethanol, hydrogenated bisphenol A and the like; trihydric or higher hydric alcohols such as glycerin, trimethylolpropane, trimethylolethane, pentaerythritol and the like. Polybasic acids which can be used include, for example, dibasic acids such as isophthalic acid, terephthalic acid, phthalic acid, hexahydrophthalic acid, hexahydroisophthalic acid, hexahydroterephthalic acid, tetrahydrophthalic acid, adipic acid, sebacic acid, succinic acid, maleic acid. fumaric acid, dodecanoic acid and the like; trivalent or higher valence basic acids such as trimellitic acid, pyromellitic acid, methylcyclohexenetricarboxylic acid and the like; acid anydrides of above-mentioned dibasic, trivalent or higher valence basic acids; low alkyl esters such as dimethyl esters of above-mentioned dibasic, trivalent or higher valence basic acids and the like. Examples of hydroxy-acids include, for example, p-oxy benzoic acid, dimethylolpropionic acid, oxypivalic acid, epsilon-caprolactone and the like. Examples of monoepoxy compounds are, for example, propylene oxide, butylene oxide, Cardular E-10 (tradename, a product of Shell Chemical Co., a glycidyl ester of high-branched saturated fatty acid) and the like. Examples of monobasic acids used molecular weight control include, for example, benzoic acid, crotonic acid, p-tert-butyl benzoic acid and the like.

Among these ingredients, cyclohexane-1,4-dimethanol, 1,6-hexanediol, neopentyl glycol and 3,3-dimethylolheptane are preferable as dihydric alcohol; trimethylolpropane and glycerin as trihydric or higher hydric alcohol; isophthalic acid, adipic acid, hexahydrophthalic acid and hexahydroterephthalic acid as dibasic acid; trimellitic anhydride as trivalent or higher valence basic acid, respectively.

The number-average molecular weight of the polyester resin having carboxylic functionality is about from 800 to 3,000.

The acrylic or polyester resins having carboxylic functionality can be used singly or in combination.

EPOXY RESIN (b)

The epoxy resin (b) is an epoxy resin having an epoxy equivalent of about from 380 to 2,300, and preferably about from 500 to 1,500, and a number-average molecular weight of about from 700 to 3,000, preferably about from 1,000 to 2,000, and includes various kinds of epoxy resins such as bisphenol-, novolac- and like type epoxy resins.

If the epoxy equivalent of the epoxy resin is lower than about 380, it results in a coating film inferior in processability, while an epoxy resin having an epoxy equivalent higher than about 2,300 causes poor storage stability of the coating composition.

If the number-average molecular weight of the epoxy resin is lower than about 700, it results in a coating film inferior in processability because of the brittleness of the coating film, while an epoxy resin having a number-average molecular weight higher than about 3,000 causes a coating film inferior in glossy surface, smooth surface and processability because of poor compatibility with the aforementioned resin having carboxyl functionality (a).

Examples of the above epoxy resins that are commercially available include bisphenol A based epoxy resins such as Epikote #1001, #1002, #1004 and #1007 (trade names of epoxy resins marketed by Shell Chemical Co.), Araldite AER6094 (trade name of epoxy resin marketed by Asahi-Chiba Co.); bisphenol F based epoxy resins such as Epotote YDF170 (trade name of epoxy resin marketed by Toto Chemical Co.) and the like.

TERTIARY AMINE (c)

The tertiary amine (c) is a basic compound which, as a neutralizing agent, is capable of changing the epoxy group in the epoxy resin (b) to a quatemary ammonium salt or neutralizing the carboxyl group in the resin having carboxyl functionality (a) to form a water-soluble or water-dispersible coating composition. Examples of the tertiary amine (c) include triethylamine, triisopropylamine, tributylamine, triethanolamine, dimethylaminoethanol, diethylaminoethanol and the like, preferably triethylamine and dimethylaminoethanol.

In the present invention, the resin having carboxyl functionality (a), the epoxy resin (b) and the tertiary amine (c) are reacted to form a resin mixture in which at least about 50 mole % of the epoxy groups of said epoxy resin (b) is quaternary ammonium salt.

The mixing ratio of the above resin (a) to the resin (b) is in the range of about from 50 to 90 parts by weight, preferably about from 70 to 90 parts by weight of the former to about from 10 to 50 parts by weight, preferably about from 10 to 30 parts by weight of the latter. If the mixing ratio of the resin (a) to the resin (b) is lower than about 50 parts by weight, it results in a coating composition inferior in storage stability, while the mixing ratio higher than about 90 parts by weight of the resin (a) to the resin (b) results in a coating film inferior in processability, hardness and retorting resistant properties.

In the aforementioned reaction, the tertiary amine (c) is used in an amount sufficient to change at least about 50 mole %, preferably about 60 mole %, of the epoxy group in the epoxy resin (b) to a quaternary ammonium salt and neutralize the carboxyl group in the resin (a) to form a stable water-soluble or water-dispersible coating composition. The molar ratio of the tertiary amine (c) is generally in the range of about from 3 to 30, preferably about from 4 to 25, per one equivalent of the epoxy group in the epoxy resin (b). If the ratio of the quaternary ammonium salt is lower than about 50 mole %, it tends to cause gellation during production and much more amounts of solvent are required since the viscosity of the reaction product raises remarkably and, furthermore, the resulting coating film is inferior in surface smoothness.

The mixture of the resins obtained by the aforementioned reaction of the present invention contains, as an essential component, the quaternary ammonium salt-containing epoxy resin in which a salt forms between an ammonium cation and an anion based on the resin having carboxyl functionality (a) as a counter-ion of said ammonium cation. Optionally, the mixture may contain an ester which is formed by the reaction between the epoxy group in the epoxy resin (b) and the carboxyl group in the resin having carboxyl functionality (a), a neutralized product of the resin having carboxyl functionality (a) by the tertiary amine (c), unreacted resin having carboxyl functionality (a), unreacted epoxy resin (b) and the like.

In the present invention, the aforementioned mixture of the resins is solubilized or dispersed in water, and the curing of the coating proceeds, for example, by the esterification reaction between the epoxy group formed from the ammonium salt in the quaternary ammonium salt-containing epoxy resin through decomposition during heating and the carboxyl group of the resin having carboxyl functionality, by the reaction between the epoxy group of the aforementioned epoxy resin and the secondary hydroxy group of the epoxy resin, by the esterification reaction between the secondary hydroxy group of the epoxy resin and the carboxyl group of the resin having carboxyl functionality or by like reaction.

The can exterior coating composition of the present invention may optionally include, as a reactive diluent, aminoplast, polyether-polyol and the like. However, it is preferable that the amount of these compounds is less than about 10% by weight per total solids of the coating composition since these compounds can cause the generation of fumes.

The can exterior coating composition of the present invention may include, for example, optional additives such as levelling agents, defoamers, lubricants, organic solvents, pigments and the like. Pigments can be added to the composition, for example, in the state of pigment paste which is prepared by mixing pigments and the solution of the resin having carboxyl functionality (a).

While the solid content of the composition is not specifically limited, it is desirable to be in the range of about 50 to about 70% by weight.

The can exterior coating composition of the present invention can be applied to metallic substrates which are useful for the substrate of cans, such as aluminum, tin plate and tin-free steel, which is cylindrical (after molding) or flat (before molding) in shape. Examples of methods of coating the coating composition on the surface of the metal material for use in the can include per se known methods such as roll coating, curtain-flow coating, spray coating, electrostatic spray coating and the like.

The coating compositions of the present invention can be used as a clear or white coating paint for the exterior surface of a can. In the case where the coating composition of the present invention is used as a white coating paint for the exterior surface of a can, the coating composition contains white pigments such as titanium dioxide and, optionally, extender pigments such as talc, calcium carbonate, silica and the like.

The coating composition of the present invention minimizes the generation of fumes in an oven during curing and provides a coating film with a smooth and glossy surface, excellent processability, excellent retorting resistant properties and excellent adhesion properties.

The application process of the can exterior coating composition of the present invention is not critical. However, in general, a white coating of the present invention is applied either directly on the metal substrate or on a size-coating as a primer and then printing coating is applied thereon by using oil base ink and the like. Thereafter, a clear paint for finishing is applied. In some cases, the application of the white coating paint is omitted in the aforementioned application process. The clear paint for finishing is applied after the printing coating.

The film thickness of present coating is generally about from 5 to 15 microns (after curing) and the baking of the film is generally conducted at a temperature of about from 160° to 220° C. for a period of about from 30 seconds to 10 minutes both in the case where the coating composition of the present invention is used as a white coating paint and in the case where it is used as a clear coating.

The present invention is explained more in detail by the following Examples and Comparative Examples, in which parts and percentages are all by weight.

PRODUCTION OF ACRYLIC RESIN HAVING CARBOXYL FUNCTIONALITY

Component Preparation 1

In a four-necked flask equipped with a stirrer, cooling condenser, thermometer and dropping funnel, 43 parts of ethylene glycol monobutyl ether were charged, followed by replacing the inner space with a nitrogen gas and heating to a temperature of 100° C. with agitation. Then, a mixture of 20 parts of acrylic acid, 30 parts of 2-ethylhexyl acrylate, 50 parts of methyl methacrylate and 5 parts of benzoyl peroxide was added dropwise over 3 hours. The mixture was kept at 100° C. for 2 hours to obtain a solution of the acrylic resin having carboxyl functionality (A-1) having a solid content of 70 %. The resin (solid content) had an acid value of 156 and a number-average molecular weight of 5,100 (determined by Gel Permeation Chromatography).

Component Preparations 2 to 4

The general procedure of Component Preparation 1 was repeated, except that the compositions of monomers and polymerization initiator shown in Table 1 were used, to obtain solutions of acrylic resins (A-2) to (A-4), respectively.

PRODUCTION OF POLYESTER RESIN HAVING CARBOXYL FUNCTIONALITY

Component Preparation 5

In a four-necked flask equipped with a stirrer, cooling condenser, thermometer, water separator and nitrogen gas inlet tube, 5.5 parts of trimethylolpropane, 22 parts of 1,6-hexanediol, 20 parts of neopentyl glycol, 25.5 parts of isophthalic acid, 22.4 parts of adipic acid and 0.1 parts of p-toluenesulfonic acid were charged, followed by heating to a temperature of 220° C. gradually over 4 hours. Esterification reaction was conducted at 220° C. and then cooled to add 18 parts of trimellitic anhydride. The mixture was heated to a temperature of 160° C. and the reaction was conducted until the acid value of the resin reached 95. After that, ethylene glycol monobutyl ether was added to obtain a solution of polyester resin having carboxyl functionality (P-1) with a solid content of 80%. The resin (solid content) had an acid value of 95, a hydroxyl value of 80 and a number-average molecular weight of 820.

Component Preparations 6 and 7

The general procedures of Component Preparation 5 was repeated, except that the compositions of ingredients shown in Table 2 were used, to obtain solutions of polyester resins (P-2) and P-3), respectively.

PRODUCTION OF EPOXY RESIN

Component Preparation 8

In a four-necked flask equipped with a stirrer, cooling condenser, thermometer and nitrogen gas inlet tube, 372 parts of Epikote #828 (epoxy resin marketed by Yuka-Shell Chemical Co.), 165 parts of bisphenol A and 0.04 parts of tetraethylammonium bromide were charged, followed by being kept at 140° C. under nitrogen. The reaction was traced by measuring both an epoxy equivalent and the viscosity of the solution which was diluted with butyl carbitol to 40%. About 3 hours after, a bisphenol A based epoxy resin (E-1) having an epoxy equivalent of 970, a 40% solution viscosity of U, a number-average molecular weight of 1,280 and a solid content of 100% was obtained.

Component Preparation 9

According to the same manner as Component Preparation 8, 336 parts of Epikote #806H, 145 parts of bisphenol F and 0.03 parts of tetraethylammonium bromide were reacted to obtain a bisphenol F based epoxy resin (E-2) having an epoxy equivalent of 860, a 40% solution viscosity of G, a number-average molecular weight of 1,450 and a solid content of 100%.

EXAMPLES OF AQUEOUS COATING COMPOSITIONS

Example 1

In a four-necked flask equipped with a stirrer, thermometer and cooling condenser, 114 parts of acrylic solution (A-1) obtained in Component Preparation 1, 20 parts of epoxy resin (E-1) obtained in Component Preparation 8 and 19.8 parts of dimethylaminoethanol were charged and reacted at a temperature of 80° C. The reaction was traced by measuring an acid value of the mixture and conducted until no epoxy group was detected. After that, deionized water was added to adjust the solid content of the aqueous solution to be 60%. The ratio of quaternary ammonium salt of the resin solid was 78 mole % (determined by electroconductivity titration method).

In the present invention, "the ratio of quaternary ammonium salt" denotes the molar ratio of quaternary ammonium salt formed after reaction per all the initial epoxy groups in the ingredients. In the electroconductivity titration method by using dimethyl sulfoxide/dioxane (80/20 weight ratio) mixture as a solvent and bromophenol blue as a titration reagent, there existed four inflection points in the titration curve which represents the relationship between the amounts of bromophenol blue titrated and the electroconductivity of the system. The ratio of quaternary ammonium salt can be calculated from the first inflection point because the first inflection point represents the amounts of quaternary ammonium salt from the viewpoint of tiration reaction mechanism.

Examples 2 to 18

The general procedures of Example 1 was repeated, except that the compositions of ingredients shown in Table 3 were used, to obtain the aqueous coating compositions. Examples 11 to 18 are for comparison, showing the preferred incorporation of pigment.

EXAMPLES 1 TO 20 AND COMPARATIVE EXAMPLES A TO R

Example 1

To the aqueous coating composition obtained in Preparation Example 1, deionized water was added to obtain an aqueous clear paint for exterior surface of can having a viscosity (measured by Brookfield Viscometer at 60 rpm at 25° C., the same shall apply hereinafter) of about 5 poise.

EXAMPLES 2 TO 10 AND COMPARATIVE EXAMPLES A TO I

The general procedure of Example 1 was repeated, except that the aqueous coating compositions shown in Table 4 were used, to obtain aqueous clear paints for exterior surface of can having a viscosity of about 5 poise.

Example 11

A mixture of 50 parts (30 parts as solids) of the aqueous coating composition obtained in Example 1, 130 parts of titanium dioxide and appropriate amount of deionized water for viscosity control was dispersed by means of shaker to obtain a pigment paste (G-1).

Then, the pigment paste (G-1) was added to the aqueous coating composition obtained in Preparation Example 1 in an amount that the content of titanium dioxide is 130 parts per 100 parts of the total resin solids, and, furthermore, deionized water was added to obtain an aqueous white coating paint for exterior surface of can having a viscosity of about 8 poise.

EXAMPLES 12 TO 20 AND COMPARATIVE EXAMPLES J TO R

The general procedure of Example 11 was repeated, except that the aqueous coating compositions or the acrylic solution (A-1) neutralized with dimethylaminoethanol, and the contents of titanium dioxide and the resin solids in the final paint compositions shown in Table 5 were used, to obtain aqueous white coating paints for exterior surface of can.

The aqueous clear paints and the aqueous white coating paints for exterior surface of cans were tested, and the results are summarized in Tables 4 and 5, respectively.

TEST PROCEDURES

Amount of fume: 0.2 g (as solids) of the paint was coated onto a substrate having an area of 100 $cm^2$ followed by heating at a temperature of 210° C. for 3 minutes under the closed state to catch the fume on a fume-catcher. The amount of fume was represented in terms of g/kg-paint by multiplying the amount of fume caught (g) by 5,000.

Gel fraction: A film of a paint composition cured at a temperature of 200° C. for 1 minute having film thickness of about 6 microns was formed on a tin-free sheet, weighed, immersed with the sheet into methyl ethyl ketone, and then boiled at reflux for 2 hours. The gel fraction was represented by percentage of an amount of residue after 2 hours reflux.

Processability: A coated plate was cut into a size of 40 mm×50 mm. The resulting test piece was folded into two equal parts in such a way that the film was outside and the bent portion became 40 mm. Two tin-free steel plates of 0.23 mm in thickness were inserted into between the two parts of the test piece, and a 3-kg load was dropped on the bent portion of the test piece from a height of 42 cm. Then, a voltage (6.5 V) was applied between the two ends of the bent portion (2 cm width) for 6 seconds to measure the current value (mA). The processability was evaluated according to the following criteria:

a: Current value less than 3 mA
  b: Current value of 3 to less than 10 mA
  c: Current value of 10 mA or more Retorting resistance: A test panel prepared by coating onto a #25 tinplate was treated at 125° C. for 30 minutes in an autoclave followed by dipping into water to evaluate a degree of blushing of the film by observation with the naked eye according to the following criteria:

a: No blushing
  b: Slight degree of blushing
  c: Remarkable degree of blushing Hardness: A coated test piece was placed on a hot plate having a temperature of 120° C. in such a way that the film was outside. The hardness of the film was evaluated by the pencil hardness according to the following criteria:

a: No damage at 2B
  b: No damage at 4B and damage at 2B
  c: Damage at 4B

Finish appearance: Evaluated with an unaided eye from the viewpoint of gloss and smoothness according to the following criteria:

a: Excellent
  b: Good
  c: Poor

Storage stability: The coating composition was placed into a vessel, sealed and stored at 40° C. for 7 days. The resulting stored coating composition was evaluated according to the following criteria:

a: No caking nor phase separation b: Slight degree of caking c: Phase separation

TABLE 1

| COMPONENT PREPARATION | 1 | 2 | 3 | 4 |
|---|---|---|---|---|
| Kind of Acrylic Resin Solution | A-1 | A-2 | A-3 | A-4 |
| INGREDIENTS | | | | |
| Methyl methacrylate | 50 | 16 | | |
| 2-Ethylhexyl acrylate | 30 | 54 | | |
| Styrene | | | 10 | 10 |
| Ethyl acrylate | | | 60 | 60 |
| N-Butoxymethyl acrylamide | | | 20 | 10 |
| Acrylic acid | 20 | 30 | | |
| Methacrylic acid | | | 10 | 20 |
| Benzoyl peroxide | 5 | 5 | 5 | 5 |
| CHARACTERISTICS | | | | |
| Solid content (% by weight) | 70 | 70 | 70 | 70 |
| Acid value | 156 | 234 | 71 | 134 |
| Number-average molecular weight | 5,100 | 8,300 | 6,300 | 7,600 |

TABLE 2

| COMPONENT PREPARATION | 5 | 6 | 7 |
|---|---|---|---|
| Kind of Polyester Resin Solution | P-1 | P-2 | P-3 |
| INGREDIENTS | | | |
| Trimethylolpropane | 5.5 | | 27 |
| Cyclohexyl dimethanol | | | 100 |
| Neopentyl glycol | 20 | 105 | |
| 3,3-Dimethylol-heptane | | | 16 |
| 1,6-Hexanediol | 22 | | |
| Phthalic anhydride | | 79 | |
| Isophthalic anhydride | 25.5 | | 73 |
| Adipic acid | 22.4 | 26 | 64 |
| Trimellitic anhydride | | 23 | |
| p-Toluenesulfonic acid | | | 0.2 |
| Trimellitic anhydride | (18) | | (34) |
| CHARACTERISTICS | | | |
| Solid content (% by weight) | 80 | 80 | 70 |
| Acid value | 95 | 65 | 72 |
| Hydroxyl value | 80 | 57 | 30 |
| Number-average molecular weight | 820 | 920 | 1,920 |

The trimellitic anhydride in the parenthesis is used for the second-step addition reaction.

TABLE 3

| COMPONENT PREPARATION | | 1 | 2 | 3 | 4 | 5 | 6 | 7 | 8 | 9 |
|---|---|---|---|---|---|---|---|---|---|---|
| Acrylic Resin Solution | Kind | A-1 | A-1 | A-1 | A-1 | A-2 | | | | A-3 |
| | Amount (parts) | 114 | 129 | 100 | 114 | 114 | | | | 114 |
| Polyester Resin Solution | Kind | | | | | | P-1 | P-2 | P-3 | |
| | Amount (parts) | | | | | | 100 | 100 | 114 | |
| Epoxy Resin | Kind | E-1 | E-1 | E-1 | E-2 | E-1 | E-1 | E-1 | E-1 | E-1 |
| | Amount (parts) | 20 | 10 | 30 | 20 | 20 | 20 | 20 | 20 | 20 |
| Amine(*3) | Kind | DMAE | DMAE | TEA | DMAE | DMAE | DMAE | DMAE | TEA | TEA |
| | Amount (parts) | 19.8 | 22.3 | 19.7 | 19.8 | 29.7 | 12.1 | 7.9 | 10.4 | 10.2 |
| CHARACTERISTICS | | | | | | | | | | |
| Solid content (% by weight) | | 60 | 59 | 64 | 61 | 58 | 76 | 78 | 69 | 53 |
| Quaternary salt ratio (mole %) | | 78 | 82 | 73 | 80 | 79 | 72 | 63 | 70 | 72 |
| Viscosity (Poise)(*4) | | 10 | 8 | 12 | 9 | 8 | 5 | 6 | 5 | 10 |
| COMPONENT PREPARATION | | 10 | 11 | 12 | 13 | 14 | 15 | 16 | 17 | 18 |
| Acrylic Resin Solution | Kind | A-4 | A-1 | A-1 | A-1 | A-1 | A-1 | A-1 | A-1 | A-1 |
| | Amount (parts) | 114 | 132 | 64 | 114 | 129 | 114 | 114 | 114 | 114 |
| Polyester Resin Solution | Kind | | | | | | | | | |
| | Amount (parts) | | | | | | | | | |
| Epoxy Resin | Kind | E-1 | E-1 | E-1 | E-1 | E-2 | (*1) | (*2) | E-1 | E-1 |
| | Amount (parts) | 20 | 8 | 55 | 20 | 10 | 20 | 20 | 20 | 20 |
| Amine(*3) | Kind | DMAE | DMAE | DMAE | DMAE | DMAE | DMAE | DMAE | TEA | DEA |
| | Amount (parts) | 11.0 | 24.0 | 11.1 | 3.6 | 1.8 | 19.8 | 19.8 | 4 | 21.8 |
| CHARACTERISTICS | | | | | | | | | | |
| Solid content (% by weight) | | 54 | 57 | 74 | 68 | Gellation | 61 | 61 | Gellation | 52 |
| Quaternary salt ratio (mole %) | | 52 | 83 | 55 | 45 | | 86 | 67 | | 14 |
| Viscosity (Poise)(*4) | | 15 | 8 | 18 | 32 | | 25 | 6 | | 45 |

Note
(*1)EPICOTE#1009, a product of YUKA-SHELL Co., bisphenol-A type epoxy resin (number-average molecular weight; about 3,750, epoxy equivalent; about 3,250).
(*2)EPICOTE#828, a product of YUKA-SHELL Co., bisphenol-A type epoxy resin (number-average molecular weight; about 350, epoxy equivalent; about 190).
(*3)DMAE; Dimethylaminoethanol, TEA; Triethylamine, DEA; Diethanolamine
(*4)Measured by Brookfield Viscometer at 60 rpm at 25° C.

TABLE 4

|  | Examples | | | | | | | | | |
|---|---|---|---|---|---|---|---|---|---|---|
|  | 1 | 2 | 3 | 4 | 5 | 6 | 7 | 8 | 9 | 10 |
| Paint Formulation | | | | | | | | | | |
| Kind (Prepn. No.) | 1 | 2 | 3 | 4 | 5 | 6 | 7 | 8 | 9 | 10 |
| Amount (solid, parts) | 100 | 100 | 100 | 100 | 100 | 100 | 100 | 100 | 100 | 100 |
| TEST ITEMS | | | | | | | | | | |
| Amount of fume (g/kg-paint) | 0.5 | 0.2 | 0.6 | 0.5 | 0.5 | 1.1 | 1.6 | 0.9 | 0.5 | 0.3 |
| Gel fraction (%) | 97 | 94 | 97 | 96 | 98 | 92 | 94 | 93 | 98 | 96 |
| Process ability | a | a | a | a | a | a | a | a | a | a |
| Retorting resistance | a | a | a | a | a | b | b | b | a | a |
| Hardness | a | b | a | a | a | b | b | b | a | a |
| Finish appearance | a | a | b | a | a | a | a | a | a | a |
| Storage stability | a | a | b | a | a | a | a | a | a | a |

|  | Comparative Examples | | | | | | | | |
|---|---|---|---|---|---|---|---|---|---|
|  | A | B | C | D | E | F | G | H | I |
| PAINT FORMULATION | | | | | | | | | |
| A-1 Solution (solid, parts) | | | | | | | | 100 | 80 |
| Dimethylaminoethanol (parts) | | | | | | | | 21.0 | 17.8 |
| Resin       Kind (Prepn. No.) | 11 | 12 | 13 | 15 | 16 | 18 | 18 | | |
| Dispersion Amount (solid, parts) | 100 | 100 | 100 | 100 | 100 | 100 | 80 | | |
| Melamine (solid, parts)(*5) | | | | | | | 20 | | 20 |
| TEST ITEMS | | | | | | | | | |
| Amount of fume (g/kg-paint) | 0.5 | 0.4 | 0.3 | 0.5 | 1.5 | 0.9 | 4.9 | — | 5.2 |
| Gel fraction (%) | 85 | 90 | 98 | 92 | 96 | 62 | 92 | 0 | 97 |
| Process ability | c | c | a | c | c | c | c | c | c |
| Retorting resistance | c | b | a | c | b | c | c | c | c |
| Hardness | c | b | a | a | a | c | b | c | a |
| Finish appearance | a | c | c | c | a | c | a | a | a |
| Storage stability | a | c | a | c | b | c | c | a | a |

Note
(*5)CYMEL#303, a product of MITSUI CYANAMID Co., methylated melamine resin.

TABLE 5

|  | Examples | | | | | | | | | |
|---|---|---|---|---|---|---|---|---|---|---|
|  | 11 | 12 | 13 | 14 | 15 | 16 | 17 | 18 | 19 | 20 |
| PAINT FORMULATION | | | | | | | | | | |
| Titanium Dioxide (parts) | 130 | 130 | 130 | 130 | 130 | 130 | 130 | 130 | 130 | 130 |
| Resin       Kind (Prepn. No.) | 1 | 2 | 3 | 4 | 5 | 6 | 7 | 8 | 9 | 10 |
| Dispersion Amount (solid, parts) | 100 | 100 | 100 | 100 | 100 | 100 | 100 | 100 | 100 | 100 |
| TEST ITEMS | | | | | | | | | | |
| Amount of fume (g/kg-paint) | 0.2 | 0.1 | 0.3 | 0.2 | 0.2 | 0.5 | 0.7 | 0.4 | 0.2 | 0.1 |
| Gel fraction (%) | 99 | 97 | 99 | 98 | 99 | 96 | 97 | 97 | 99 | 98 |
| Process ability | a | a | a | a | a | a | a | a | a | a |
| Retorting resistance | a | a | a | a | a | b | b | b | a | a |
| Hardness | a | b | a | a | a | b | b | b | a | a |
| Finish appearance | a | a | b | a | a | a | a | a | a | a |
| Storage stability | a | a | b | a | a | a | a | a | a | a |

|  | Comparative Examples | | | | | | | | |
|---|---|---|---|---|---|---|---|---|---|
|  | J | K | L | M | N | O | P | Q | R |
| PAINT FORMULATION | | | | | | | | | |
| Titanium Dioxide (parts) | 130 | 130 | 130 | 130 | 130 | 130 | 130 | 130 | 130 |
| A-1 Solution (solid, parts) | | | | | | | | 100 | 80 |
| Dimethylaminoethanol (parts) | | | | | | | | 21.0 | 17.8 |
| Resin Kind (Prepn. No.) | 11 | 12 | 13 | 15 | 16 | 18 | 18 | | |
| Dispersion Amount (solid, parts) | 100 | 100 | 100 | 100 | 100 | 100 | 80 | | |
| Melamine (solid, parts)(*5) | | | | | | | 20 | | 20 |

TABLE 5-continued

| TEST ITEMS | | | | | | | | | |
|---|---|---|---|---|---|---|---|---|---|
| Amount of fume (g/kg-paint) | 0.2 | 0.2 | 0.1 | 0.2 | 0.7 | 0.4 | 2.2 | — | 2.3 |
| Gel fraction (%) | 93 | 96 | 99 | 96 | 98 | 83 | 96 | 56 | 99 |
| Process ability | c | c | a | c | c | c | c | c | c |
| Retorting resistance | c | b | a | c | b | c | c | c | c |
| Hardness | c | b | a | a | a | c | b | c | a |
| Finish appearance | a | c | c | c | b | c | a | a | a |
| Storage stability | a | c | a | c | c | c | c | a | a |

Note
(*5)CYMEL#303, a product of MITSUI CYANAMID Co., methylated melamine resin.

We claim:

1. An aqueous composition, for coating the exterior surface of a can, comprising a water-soluble or water-dispersible reaction product prepared from:

(a) about from 50 to 90 parts by weight of at least one resin having carboxyl functionality having an acid value of about from 30 to 300 selected from the group consisting of acrylic resin having a number-average molecular weight of 4,000 to 20,000 and polyester resin having a number-average molecular weight of 800 to 3,000;

(b) 10 to 50 parts by weight of epoxy resin having an epoxy equivalent of about from 380 to 2,300 and a number-average molecular weight of about from 700 to 3,000; and (c) a tertiary amine, resulting in at least 50 mole % of the epoxy groups of the epoxy resin (b) being quaternary ammonium salt, the composition comprising at least about 30% water and wherein the aqueous composition contains substantially no epoxy groups.

2. An aqueous coating composition according to claim 1 wherein the mixing ratio of the resin having carboxyl functionality (a) to the epoxy resin (b) is in the range of 70 to 90 parts by weight of the resin having a carboxyl functionality to 10 to 30 parts by weight of the epoxy resin.

3. An aqueous coating composition for a white coating paint for exterior surface of a can according to claim 1 wherein the composition further comprises white pigment.

4. A can bearing a dried coating composition of claim 1.

5. A process of coating comprising applying to the exterior surface of a can an aqueous composition of claim 1 and drying the applied coating.

6. A process of claim 5 wherein the composition is applied to the can by spray coating.

7. A process of claim 5 wherein the composition is applied to the can by roll coating.

8. A aqueous coating composition for a white coating paint for exterior surface of a can according to claim 2 wherein the composition further comprises white pigment.

* * * * *